US008334223B2

United States Patent
Lubker, II

(10) Patent No.: US 8,334,223 B2
(45) Date of Patent: *Dec. 18, 2012

(54) PROTECTIVE DRAINAGE WRAPS

(75) Inventor: John W. Lubker, II, Roswell, GA (US)

(73) Assignee: Pactiv Corporation, Lake Forest, IL (US)

( * ) Notice: Subject to any disclaimer, the term of this patent is extended or adjusted under 35 U.S.C. 154(b) by 1254 days.

This patent is subject to a terminal disclaimer.

(21) Appl. No.: 11/212,357

(22) Filed: Aug. 26, 2005

(65) Prior Publication Data

US 2005/0287338 A1 Dec. 29, 2005

Related U.S. Application Data

(60) Continuation of application No. 10/869,333, filed on Jun. 16, 2004, now Pat. No. 7,196,024, which is a division of application No. 10/255,273, filed on Sep. 26, 2002, now Pat. No. 6,869,901, which is a continuation-in-part of application No. 09/788,776, filed on Feb. 20, 2001, now Pat. No. 6,550,212.

(51) Int. Cl.
  *B32B 5/02* (2006.01)
(52) U.S. Cl. .............. 442/43; 442/76; 442/77; 428/131; 428/137; 428/138; 428/335; 428/336
(58) Field of Classification Search ............... 442/43, 442/137, 138, 76–77; 429/131; 428/335, 428/336, 131, 137, 138
See application file for complete search history.

(56) References Cited

U.S. PATENT DOCUMENTS

| | | | |
|---|---|---|---|
| 1,609,937 A * | 12/1926 | Forrest | 442/43 |
| 3,677,874 A | 7/1972 | Sterrett et al. | 161/116 |
| 4,073,998 A | 2/1978 | O'Connor | 428/310 |
| 4,082,882 A | 4/1978 | Weinstein et al. | 428/246 |
| 4,088,805 A | 5/1978 | Wiegand | 428/310 |
| 4,114,335 A | 9/1978 | Carroll | |
| 4,147,004 A | 4/1979 | Day et al. | 63/309.9 |
| 4,158,275 A | 6/1979 | Moore | 52/210 |

(Continued)

FOREIGN PATENT DOCUMENTS

EP 0 741 204 A2 11/1996

(Continued)

OTHER PUBLICATIONS

Product Literature, "*Residentail Insulation*", TENNECO Building Products, 8 pages, (Nov. 1996).

(Continued)

*Primary Examiner* — Elizabeth Cole

(74) *Attorney, Agent, or Firm* — Nixon Peabody LLP

(57) ABSTRACT

A protective drainage wrap includes a mesh and a coating applied to the mesh. The coating is applied to the mesh to form a plurality of interstices, the interstices being configured to facilitate transfer of water vapor therethrough. The mesh includes material extending in a first direction and in a second direction. The material in the first direction includes a polyolefin, polyester, nylon or combinations thereof and has a first thickness. The material in the second direction includes a polyolefin, polyester, nylon or combinations thereof and has a second thickness. The second thickness is at least about twice the first thickness so as to assist in providing drainage for moisture build-up. The material in the second direction can be yarn. The coating includes a polyolefin, polyester, nylon or combinations thereof. A process for the preparation of the protective drainage wrap is provided.

3 Claims, 11 Drawing Sheets

U.S. PATENT DOCUMENTS

| | | | |
|---|---|---|---|
| 4,252,154 A | 2/1981 | Alexander, III | 139/304 |
| 4,418,108 A | 11/1983 | Lin | 428/139 |
| 4,425,396 A | 1/1984 | Hartman | 428/220 |
| 4,572,700 A | 2/1986 | Mantarro et al. | 404/35 |
| 4,574,541 A | 3/1986 | Raidt et al. | 52/169.5 |
| 4,621,013 A | 11/1986 | Holtrop et al. | 428/245 |
| 4,704,048 A | 11/1987 | Ahlgrimm | 405/45 |
| 4,719,734 A | 1/1988 | Fell et al. | 52/302 |
| 4,764,420 A | 8/1988 | Gluck et al. | 428/317.7 |
| 4,857,393 A * | 8/1989 | Kato et al. | 442/62 |
| 4,898,761 A | 2/1990 | Dunaway et al. | 428/137 |
| 5,053,265 A | 10/1991 | Alexander | 428/182 |
| 5,365,716 A | 11/1994 | Munson | 52/742.13 |
| 5,466,092 A | 11/1995 | Semenza et al. | 405/45 |
| 5,552,207 A | 9/1996 | Porter et al. | 428/109 |
| 5,695,870 A | 12/1997 | Kelch et al. | 428/318.4 |
| 5,733,824 A | 3/1998 | Brunka et al. | 442/153 |
| 5,773,123 A | 6/1998 | Anwyll, Jr. | 428/137 |
| 5,786,064 A | 7/1998 | Finestone et al. | 428/137 |
| 5,787,668 A | 8/1998 | Carkner et al. | 52/408 |
| 5,819,496 A | 10/1998 | Sperber | 52/742.13 |
| 5,826,388 A | 10/1998 | Irving | 52/302.1 |
| 5,826,390 A | 10/1998 | Sacks | 52/408 |
| 5,830,548 A | 11/1998 | Andersen et al. | 428/36.4 |
| 5,836,135 A | 11/1998 | Hagan et al. | 52/30.1 |
| 5,865,926 A | 2/1999 | Wu et al. | 156/229 |
| 5,869,408 A | 2/1999 | Porter et al. | 442/153 |
| 5,888,614 A | 3/1999 | Slocum et al. | 428/132 |
| 6,093,481 A | 7/2000 | Lynn et al. | 428/217 |
| 6,133,168 A * | 10/2000 | Doyle et al. | 442/76 |
| 6,279,284 B1 | 8/2001 | Moras | 52/408 |
| 6,355,333 B1 | 3/2002 | Waggoner et al. | 428/174 |
| 6,389,757 B1 | 5/2002 | DeGarie | 52/63 |
| 6,389,767 B1 | 5/2002 | Lucey et al. | 52/295 |
| 6,421,973 B1 | 7/2002 | Gregg et al. | 52/481.1 |
| 6,537,935 B1 | 3/2003 | Seth et al. | 442/366 |
| 6,550,212 B2 | 4/2003 | Lubker, II | 52/741.13 |
| 6,745,535 B2 | 6/2004 | Nordgren et al. | 52/506.01 |
| 6,761,006 B2 | 7/2004 | Lubker, II | 52/302.1 |
| 6,869,901 B2 | 3/2005 | Lubker, II | 442/208 |
| 7,082,733 B2 | 8/2006 | Nordgren et al. | 52/506.01 |
| 7,093,397 B2 | 8/2006 | Nordgren et al. | 52/506.01 |
| 7,100,337 B1 | 9/2006 | Nordgren et al. | 52/506.01 |
| 7,343,716 B2 | 3/2008 | Nordgren et al. | 52/506.01 |
| 2004/0229012 A1 | 11/2004 | Lubker, II | 428/131 |
| 2005/0287338 A1 | 12/2005 | Lubker, II | 428/131 |
| 2006/0194494 A1 | 8/2006 | Lubker, II | 442/208 |
| 2006/0194495 A1 | 8/2006 | Lubker, II | 442/208 |
| 2006/0211321 A1 | 9/2006 | Lubker, II | 442/208 |
| 2008/0134622 A1 | 6/2008 | Lubker | 52/741.4 |

FOREIGN PATENT DOCUMENTS

| | | |
|---|---|---|
| JP | 5096673 | 4/1993 |
| JP | 05096673 | 4/1993 |
| JP | 10-273848 | 10/1998 |
| WO | WO 02/066242 | 8/2002 |

OTHER PUBLICATIONS

Product Literature, "*Extruded Polystyrene Insulation and Housewrap*", TENNECO Building Products, 8 pages (Sep. 1998).

Product Literature, AMOCO® PLYGOOD® "*New Construction Sheathing*", TENNECO Building Products, 2 pages, (Feb. 1998).

Product Literature, "Jumbo Tex®", Weather Resistive Barrier, Fortfiber® Building Products Systems, 2 pages, (2000).

Product Literature, "Pinkwrap Housewrap", 2 pages, (Jan. 19, 2001).

Product Literature, DuPoint Tyvek® Weatherization Systems "Tyvek® Home Wrap", 3 pages, (Jan. 19, 2001).

\* cited by examiner

PROTECTIVE DRAINAGE WRAPS

CROSS-REFERENCE TO RELATED APPLICATIONS

This application is a continuation of U.S. patent application Ser. No. 10/869,333, filed Jun. 16, 2004 now U.S. Pat. No. 7,196,024, which is a division of U.S. application Ser. No. 10/255,273, filed Sep. 26, 2002, now U.S. Pat. No. 6,869,901, which is a continuation-in-part of U.S. application Ser. No. 09/788,776 filed Feb. 20, 2001, now U.S. Pat. No. 6,550,212 which is entitled "Protective Drainage Wraps" Each above application is incorporated herein by reference in its entirety.

BACKGROUND

1. Field of the Invention

The present invention relates generally to protective wraps that are used to protect against air infiltration and moisture build-up in buildings. Specifically, the protective wraps of the present invention include cross-woven or cross-laminate materials.

2. Background of the Invention

There have been many different commercial protective wraps used in the construction of buildings, such as residential and commercial construction. Commercial protective wraps are used to protect against air infiltration and damaging moisture build-up. Air infiltration may occur in typical construction through, among other places, sheathing seams and cracks around windows and doors. Moisture buildup can occur externally in the wall cavity from, for example, leaking exterior finishes or coverings, and cracks around windows and doors. The exterior of the protective wraps should not trap the water, but rather allow it to flow downward so as to exit the wall system.

Commercial protective wraps are typically used as secondary weather barriers in buildings behind exterior finishes or coverings such as siding, brick, stone, masonry, stucco and concrete veneers. Stucco may be synthetic based (e.g., a polymer-based stucco) or cementitious (a mixture of Portland cement, lime and sand). One type of stucco system, exterior insulation finish system (drainage EIFS), that is used in buildings typically involves using a drainage plane, an insulation board, and a wire or synthetic mesh that accepts a cementitious coating. In stucco systems, protective wraps are not typically installed directly in contact with the cementitious coatings. In some instances, multiple layers of protective wrap are installed with one layer contacting the cementitious coatings.

Both woven and non-woven commercial protective wraps are commonly used in the construction of buildings. The strength properties of woven wraps are typically much higher than the strength properties of non-woven wraps. Some woven wraps are translucent, which assist in locating studs, as well as window and door openings. Non-woven wraps, however, may have higher permeabilities than woven wraps.

Commercial protective wraps, such as non-woven wraps, woven wraps and cross-laminated wraps, also may be microperforated so as to allow moisture vapor to pass therethrough. Most non-woven commercial protective wraps (such as spun bonded polyolefin wraps) are not perforated because the processes used in forming the wraps result in a structure that inherently allows the moisture vapor to pass through the wrap.

Accordingly, a need exists for a protective wrap that enhances drainage of damaging moisture build-up, while still protecting against air infiltration.

SUMMARY OF THE INVENTION

According to one embodiment, a protective drainage wrap includes a mesh and a coating applied to the mesh. The coating is applied to the mesh to form a plurality of interstices, the interstices being configured to facilitate transfer of water vapor therethrough. The mesh includes material extending in a first direction and in a second direction. The material in the first direction includes a polyolefin, polyester, nylon or combinations thereof and has a first thickness. The material in the second direction includes a polyolefin, polyester, nylon or combinations thereof and has a second thickness. The second thickness is at least about twice the first thickness so as to assist in providing drainage for moisture build-up. The material in the first direction can be the same as or different from the material in the second direction. The material in the second direction can also be yarn. The material in the first direction and in the second direction can include a plurality of tapes. The coating includes a polyolefin, polyester, nylon or combinations thereof. The coating of the preferred embodiment has a thickness between about 0.5 mil and 2.0 mils. The first direction material and the coating of the preferred embodiment have a combined thickness between about 8 mils and 10 mils. The protective drainage wrap can be cross-woven or cross-laminated, and can include a plurality of perforations formed therethrough. If included, the perforations can be between about 3 to 15 mils. The application of the coating with a predetermined thickness to the mesh to form a plurality of interstices of predetermined size controls the permeability of the protective drainage wrap.

According to a method of the present invention, a protective drainage wrap is prepared by providing a mesh, and applying a coating to the mesh so as to form a plurality of interstices configured to facilitate transfer of water vapor therethrough. The mesh includes material extending in a first direction and in a second direction. The material in the first direction includes a polyolefin, polyester, nylon or combinations thereof and has a first thickness. The material in the second direction includes a polyolefin, polyester, nylon or combinations thereof and has a second thickness. The second thickness is at least about twice the first thickness so as to assist in providing drainage for moisture build-up. The material in the first direction can be the same as or different from the material in the second direction. The material in the second direction can also be yarn. The material in the first direction and in the second direction can include a plurality of tapes. The coating includes a polyolefin, polyester, nylon or combinations thereof. The coating of the preferred embodiment has a thickness between about 0.5 mil and 2.0 mils. The first direction material and the coating of the preferred embodiment have a combined thickness between about 8 mils and 10 mils. The protective drainage wrap can be cross-woven or cross-laminated, and can include a plurality of perforations formed therethrough. If included, the perforations can be between about 3 to 15 mils. The application of the coating with a predetermined thickness to the mesh to form a plurality of interstices of predetermined size controls the permeability of the protective drainage wrap.

DETAILED DESCRIPTION OF THE PREFERRED EMBODIMENTS

Figure 1:
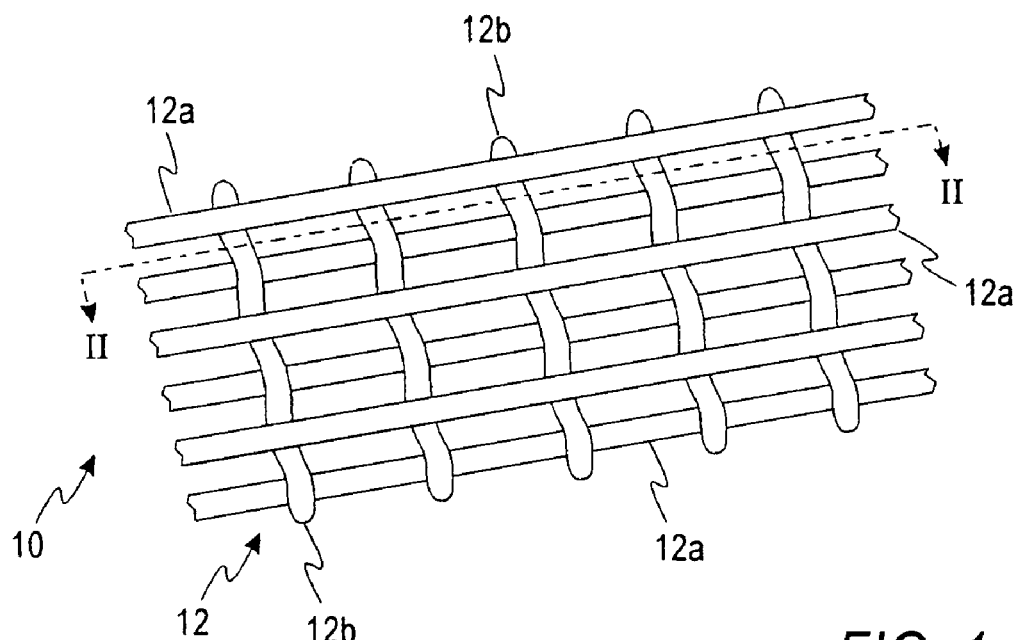
FIG. 1 is a top perspective view of a cross-woven protective wrap according to one embodiment.
Figure 2:
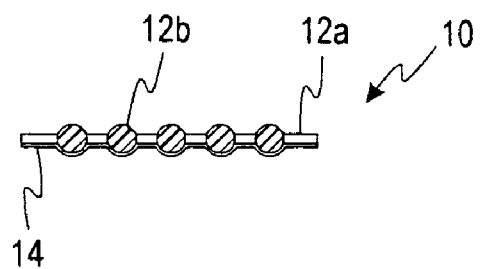
FIG. 2 is a cross-sectional view taken generally along line II-II of FIG. 1.

Turning now to the drawings and referring initially to FIGS. 1 and 2, a protective drainage wrap 10 according to one embodiment is shown. The protective wraps of the present invention, including protective wrap 10, are adapted to be attached over sheathing or framing members. The protective wraps are typically covered by an exterior covering such as siding, brick, stone, masonry, stucco (e.g., synthetic or cementitious) or concrete veneer.

Figure 3:
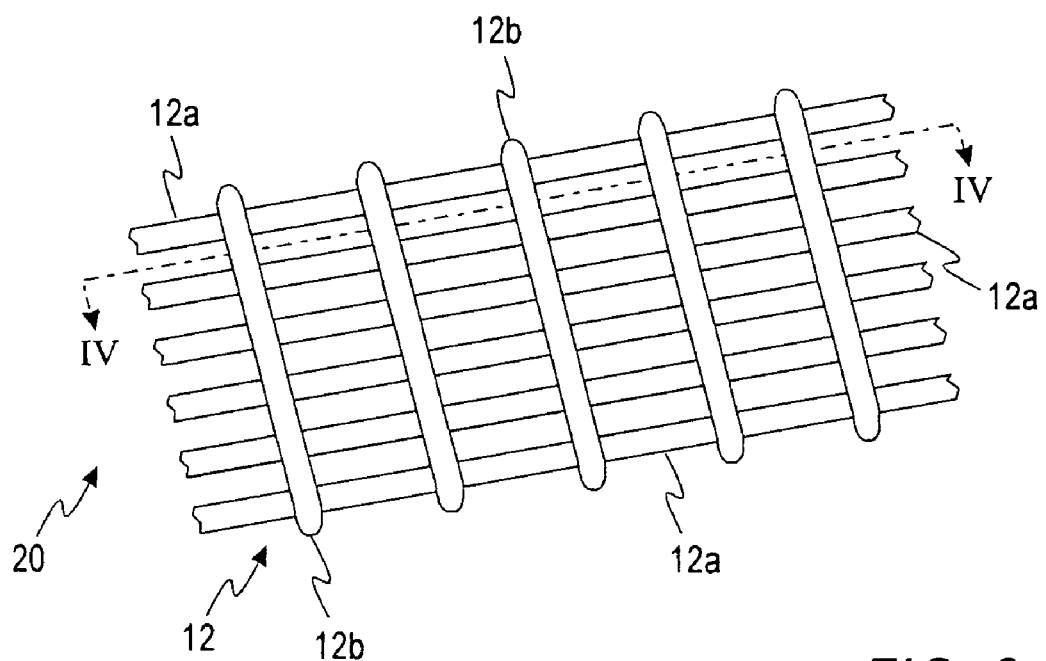
FIG. 3 is a top perspective view of a cross-laminated protective wrap according to one embodiment.
Figure 4:
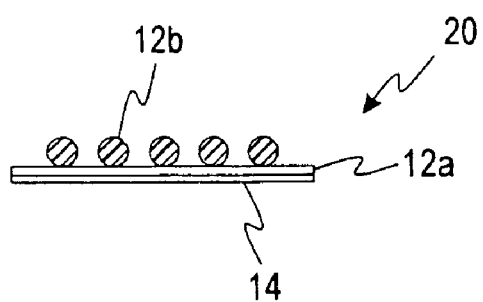
FIG. 4 is a cross-sectional view taken generally along line IV-IV of FIG. 3.

According to one embodiment, the protective wrap 10 of FIGS. 1 and 2 includes a first portion or mesh 12 and a second portion or coating 14. The first portion 12 of the protective wrap 10 may be cross-woven such as shown in FIGS. 1 and 2. Alternatively, the first portion of the present invention may be cross-laminated, such as shown in FIGS. 3 and 4 with cross-laminated protective drainage wrap 20.

First Portion or Mesh

The first portion of the protective wrap provides a desirable strength that assists in inhibiting or preventing tears and/or fraying that may be caused during installation. These tears and/or fraying may be caused by, inter alia, nails or staples during the installation of the protective wraps. These tears and/or fraying may also be caused after installation by environmental conditions such as the wind or by vandalism before the protective wrap is covered with an exterior covering.

The first portion 12, as shown in FIG. 1, includes a plurality of machine (e.g., first) direction (MD) tapes or strands 12a and a plurality of transverse (e.g., second) direction (TD) tapes or strands 12b. The machine direction is also referred to as "warp", while the transverse direction is also referred to as "fill" or "weft". The first portion 12 of FIG. 1 is commonly referred to as a cross-woven scrim.

The scrim shown in FIG. 1 is a 10×4 count scrim (MD number per inch×TD number per inch) that has been enlarged. It is also contemplated that various other scrim counts may be used, including a 7×4 count, a 10×5 count, a 16×4 count, and a 16×5 count, in forming the first portion 12 of the present invention. The scrim count is typically a greater number in the machine direction than the transverse direction. The MD scrim count is generally from about 6 to about 24 tapes per inch, while the TD scrim count is generally from about 3 to about 6 tapes per inch. The MD and TD scrim counts are generally lesser in number per inch as the respective widths of the MD and TD tapes are increased.

The plurality of machine direction tapes 12a may be made of materials such as polyolefins, polyesters, nylons or combinations thereof. Polyolefins that may be used in forming the machine direction tapes 12a include polypropylenes or polyethylenes. The term "polypropylene" as used herein includes polymers of propylene or polymerizing propylene with other aliphatic polyolefins, such as ethylene, 1-butene, 1-pentene, 3-methyl-1-butene, 4-methyl-1-pentene, 4-methyl-1-hexene, 5-methyl-1-hexene and mixtures thereof. Polypropylene not only includes homopolymers of propylene, but also propylene copolymers comprised of at least 50 mole percent of a propylene unit and a minor proportion of a monomer copolymerizable with propylene and blends of at least 50 percent by weight of the propylene homopolymer with another polymer.

The term "polyethylene" as used herein includes low density polyethylene (LDPE), medium density polyethylene (MDPE), high density polyethylene (HDPE), very low density polyethylene (VLDPE), linear low density polyethylene (LLDPE), metallocene-catalyzed linear low density polyethylene (mLLDPE) and combinations thereof.

An example of a "polyester" includes a polyester resin which is a polycondensation product of a dicarboxylic acid with a dihydroxy alcohol. An example of a "polyethylene terephthalate" includes a polyester resin made from ethylene glycol and terephthalic acid. An example of a "nylon" is a polyamide polymer, that is a polycondensation product of a dicarboxylic acid with a diamine, and that is characterized by the presence of an amide group (—CONH—.)

Each of the plurality of machine direction tapes 12a may be made of a single fiber or filament, or a plurality of fibers or filaments aligned with each other. It is contemplated that the plurality of machine direction tapes 12a may be made of a mixture of single fibers or filaments, and a plurality of fibers or filaments aligned with each other. For example, the single fibers or filaments may be alternated with the plurality of filaments aligned with each other such that the thicknesses of the plurality of machine direction tapes 12a vary. The machine direction tapes 12a may also be referred to as cords. As shown in FIG. 1, the plurality of machine direction tapes 12a are substantially flat.

The plurality of transverse direction tapes 12b may be made of materials such as polyolefins, polyesters, nylons or combinations thereof as described above with respect to the machine direction tapes 12a. Polyolefins that may be used in forming the transverse direction tapes 12b include polypropylenes and polyethylenes. Each of the plurality of transverse direction tapes 12b may be made of a single fibers or filaments, or a plurality of fibers or filaments aligned with each other. It is contemplated that the plurality of transverse direction tapes 12b may be made of a mixture of single fibers or filaments, and a plurality of fibers or filaments aligned with each other. For example, the single fibers or filaments may be alternated with the plurality of filaments aligned with each other such that the thicknesses of the plurality of transverse direction tapes 12b vary. The transverse direction tapes 12b may also be referred to as cords. As best shown in FIG. 2, each of the transverse direction tapes 12b is shaped in a generally oval manner. The plurality of transverse direction tapes 12b are preferably substantially circular or circular in shape. The transverse direction tapes 12b are shaped in a manner that will allow water to flow down the channels formed between the transverse direction tapes 12b via gravity.

If natural vapor transmission is desired in a woven protective wrap, the transverse direction tapes 12b must be of a sufficient thickness to enable a natural vapor transmission to be formed when the coating 14 is applied to the first portion 12. The natural vapor transmission mechanism is formed via open interstices/spaces along the transverse direction tapes 12b after the coating 14 is applied. A protective wrap with open interstices/spaces may not require physical perforations to meet typical building code requirements for water vapor transmission.

The protective wrap with open interstices/spaces may be perforated to enhance natural vapor transmission. If the protective wrap is formed without interstices/spaces, the protective wrap often is perforated to provide for desirable water vapor transmission. The size and shape of the perforations formed in the protective wrap may vary. If the perforations are substantially circular, the diameter of these perforations is generally from about 3 to about 15 mils. The spacing of the perforations formed in the protective wrap may also vary with respect to each other. One example of spacing that may be used between the perforations in the protective wrap is about 3/16 of an inch.

Natural vapor transmission is often desirable because of moisture build-up occurring from internal moist air present in the wall cavity. Moisture build-up may occur from materials, such as green lumber, used in framing or structural sheathing. Moisture build-up may also occur from environmental elements, such as rain, during construction before an exterior finish has been installed or water that enters the installed wall system.

The thicknesses of transverse direction tapes 12b of the present invention provide unique vertical channels, when installed, that enhance moisture drainage external to the protective wrap (i.e., between the protective wrap and the exterior finish). The installed transverse direction tapes 12b allow water to readily exit a wall system. To enhance moisture drainage, the thickness of the transverse direction tapes 12b is generally at least about 2 times greater than the thickness of the machine direction tapes 12a. The thickness of the transverse direction tapes 12b is generally at least about 3 or about 4 times greater than the thickness of the machine direction tapes 12a. The thickness of the transverse direction tapes 12b may be from about 6 to about 8 times greater than the thickness of the machine direction tapes 12a.

Figure 5:
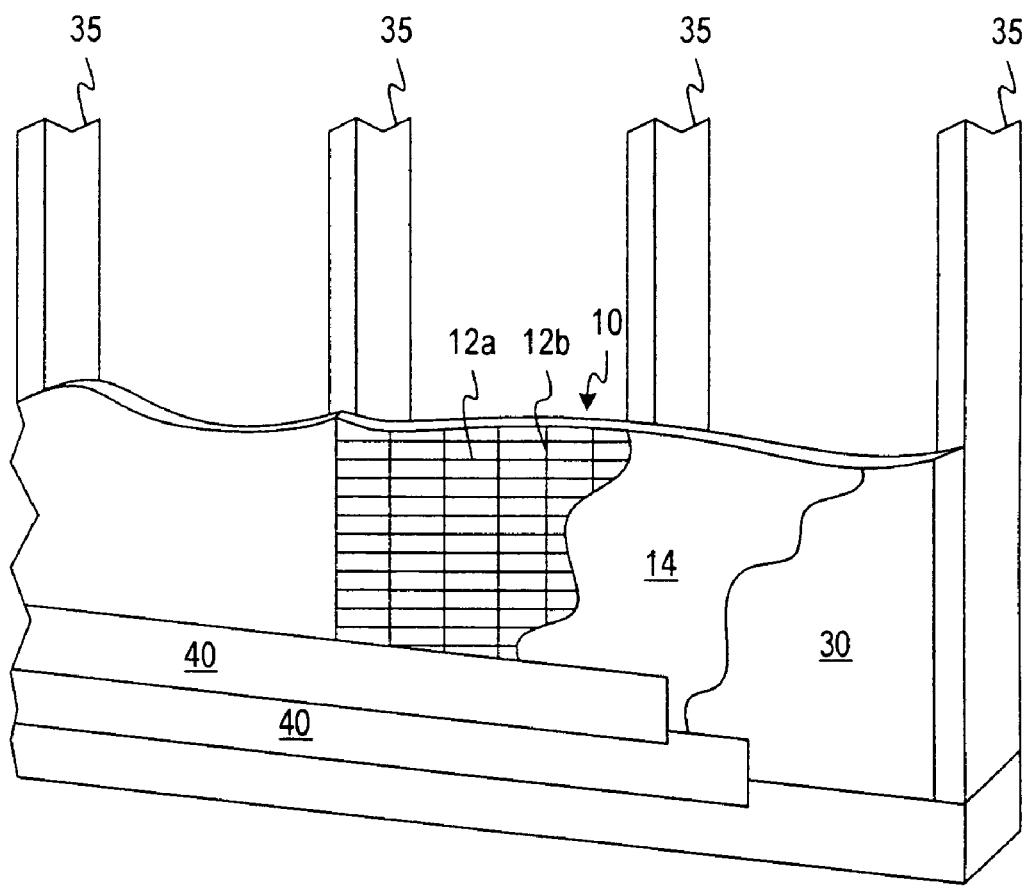
FIG. 5 is a cut-away perspective view of a protective wrap of FIG. 1 fastened to sheathing and a framing member according to one embodiment.

The plurality of transverse direction tapes 12b according to one embodiment is shown in FIG. 5 after being installed. The transverse direction tapes 12b are generally perpendicular to the machine direction tapes 12a so as to enhance moisture drainage. It is contemplated that the tapes 12b may be located generally diagonally with respect to the tapes 12a as long as the tapes 12b are in a generally downward position when installed.

The first portion 12 including a plurality of MD and TD tapes 12a and 12b may be made from an extrusion process. After being formed, the tapes 12a and 12b may be cross-woven by different processes. One contemplated process for weaving the tapes 12a and 12b together is through the use of a loom.

Alternatively, the MD and TD tapes 12a and 12b may be cross-laminated to each other by adhering the tapes 12a and 12b together via the use of a suitable adhesive (see FIGS. 3 and 4) The adhesive is selected based on the materials used to form the tapes 12a and 12b.

Second Portion or Coating

The second portion or coating 14 of the protective wrap 10 is applied to the first portion 12. The coating 14 may be made from polyolefins, polyesters, nylons or combinations thereof as discussed above with respect to the first portion 12. Polyolefins that are typically used in forming the coating 14 include polypropylenes and polyethylenes. A coating 14 made from polypropylene is desirable because of the enhanced stiffness provided to the protective wrap.

The coating 14 of the present invention is generally applied to obtain a thickness of from about 0.5 mil to about 2.0 mils, and preferably from about 0.8 to about 1.2 mil. The coating is preferably applied in a sufficient thickness to the first portion 12 so that a natural vapor transmission is formed via interstices that allow the passage of water vapor.

The coating 14 is shown as being applied to one surface of the first portion 12 in FIG. 2. It is contemplated that the coating 14 may be provided on both surfaces of the first portion 12 (not shown) as long as the coating 14 enables the transverse direction tapes 12b to still provide channels that enhance moisture drainage, external to the protective wrap.

The coating 14 may be applied by various processes to the first portion 12. According to one process of the present invention, pellets of a resin(s) for forming the coating 14 are added in their solid form into an extrusion hopper. These pellets are heated to a sufficient temperature in an extruder to form a molten material. The molten material that will form the coating 14 exits the extruder through a die. The extruder typically has a horizontal die in which the molten material exits and falls vertically by gravity onto a surface of the first portion 12. At the same time the molten material is exited from the extruder, the first portion 12 proceeds in a direction transverse to the extruder.

The first portion 12 may proceed on a transport mechanism involving rollers that pull the cross-woven or cross-laminated material along a threaded path. The transport mechanism is located below the extruder die that extrudates the coating. The amount of coating 14 applied to the first portion 12 depends on factors such as the speed of the transport mechanism, size of the extruder die opening, and speed of the coating exiting the die. These variables should preferably be controlled to obtain a desired thickness of the coating so as to form interstices that allow for the passage of water vapor.

Yarn Portion

Figure 6:
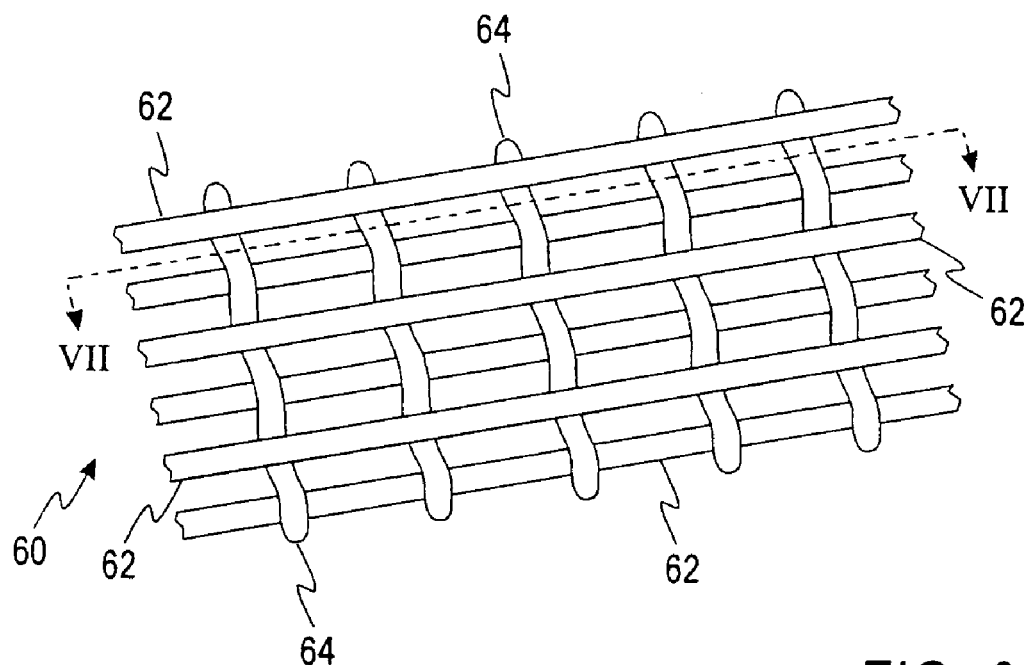
FIG. 6 is a top perspective view of a yarn cross-woven protective wrap according to another embodiment.
Figure 7:
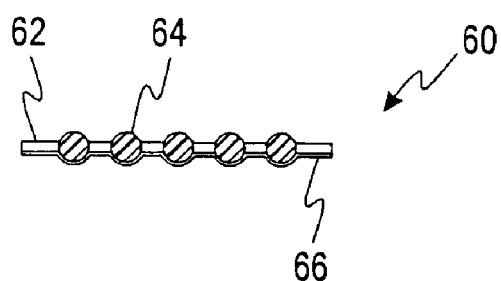
FIG. 7 is a cross-sectional view taken generally along line VII-VII of FIG. 6.

According to another embodiment, a protective drainage wrap 60 is shown in FIGS. 6 and 7. As discussed above with respect to protective wrap 10, the protective wrap 60 is adapted to be attached to sheathing or framing members. The protective wrap 60 includes a tape or strand portion 62, a yarn portion 64 and a coating portion 66. The tape portion 62 of FIGS. 6 and 7 includes a plurality of tapes in the machine direction, while the yarn portion 64 includes a plurality of yarn strands in the transverse direction.

The yarn portion 64 is capable of absorbing moisture such as water. Additionally, the yarn portion 64 may be capable of wicking the moisture which may provide further enhancement to the hydration properties. To assist in moving the water downwardly via gravity, the yarn portion 64 is preferably installed in a generally vertical position. In addition, the yarn portion 64 provides a channeling effect between the plurality of yarn strands to assist in moving the water downwardly. If the channel formed between adjacent yarn strands is blocked by, for example, stucco, then the water may be absorbed by the yarn. This absorbed water may flow downwardly via the yarn strand or may be transported to another channel for moving the water downwardly.

Types of yarn that may be used in the present invention include spun yarn, bulk continuous process (bcp) yarn and natural yarn (e.g., jute). Spun yarn may be formed by a two step process in which very small filaments are extruded and chopped to a selected length. These filaments are then spun into a continuous yarn using, for example, a spinning frame Bulk continuous process yarns may be formed by extruding 70 or 80 very small fibers into continuous filaments that are spaced in close proximity to each other. The close proximity of the continuous filaments allows for the filaments to be intertwined by air entanglement or twisting to create a single yarn.

The yarn portion 64 may be made of polymeric materials such as polyolefins, polyesters, nylons or combinations thereof. Some contemplated polyolefins to be used in forming the yarn portion 64 include polypropylenes or polyethylenes. Each of the plurality of strands of the yarn portion 64 shown in FIG. 6 is made of a plurality of fibers or filaments twisted with each other. It is contemplated that the strands of yarn portion 64 may have varying numbers of fibers or filaments twisted with each other such that the thicknesses of the strands differ. For example, the strands of yarn portion 64 may alternate the number of fibers or filaments twisted with each other to provide strands of varying thicknesses. One type of yarn that is contemplated is a spun polypropylene yarn that is manufactured by BP Amoco Fabrics. The tape portion 62 and the yarn portion 64 may be both made from polypropylenes.

The tape portion 62 may be made of materials such as polyolefins, polyesters, nylons or combinations thereof. Examples of such materials are described above with respect to the first portion 12 including polypropylenes or polyethylenes. The tape portion 62 may be made in a similar manner as described above with respect to the machine direction tape 12a.

The yarn portion 64 and the tape portion 62 are preferably located in directions that are generally perpendicular to each other. This location of the yarn portion 64 with respect to the tape portion 62 is depicted in FIG. 6. It is contemplated, however, that the yarn portion 64 may be located generally diagonally from the tape portion 62 as long as the yarn portion 64 is in a generally downward position when installed.

As depicted in FIG. 6, each of the plurality of yarn strands of the yarn portion 64 is woven between the plurality of tapes/strands of the tape portion 62. When cross-woven, the combination of the yarn portion 64 and the tape portion 62 may be referred to as a cross-woven scrim. The yarn portion 64 and the tape portion 62 may be woven by various techniques. One such example is with the use of a loom that weaves the yarn portion 64 and the tape portion 62.

Alternatively, the tape portion 62 and the yarn portion 64 may be cross-laminated (not shown) by adhering the plurality of tapes and plurality of yarn strands together via the use of a suitable adhesive.

The coating 66 may be made from polyolefins, polyesters, nylons and combinations thereof as discussed above with respect to the coating 14. Polyolefins that are typically used in forming the coating 66 include polypropylenes and polyethylenes. A coating 66 made from polypropylene is desirable because of the enhanced stiffness provided to the protective wrap. The thickness of the coating 66 is similar to that described above with respect to the coating 14. The coating 66 may be applied to the tape portion 62 and the yarn portion 64 by the same processes as described above with respect to coating 14.

Figure 9:
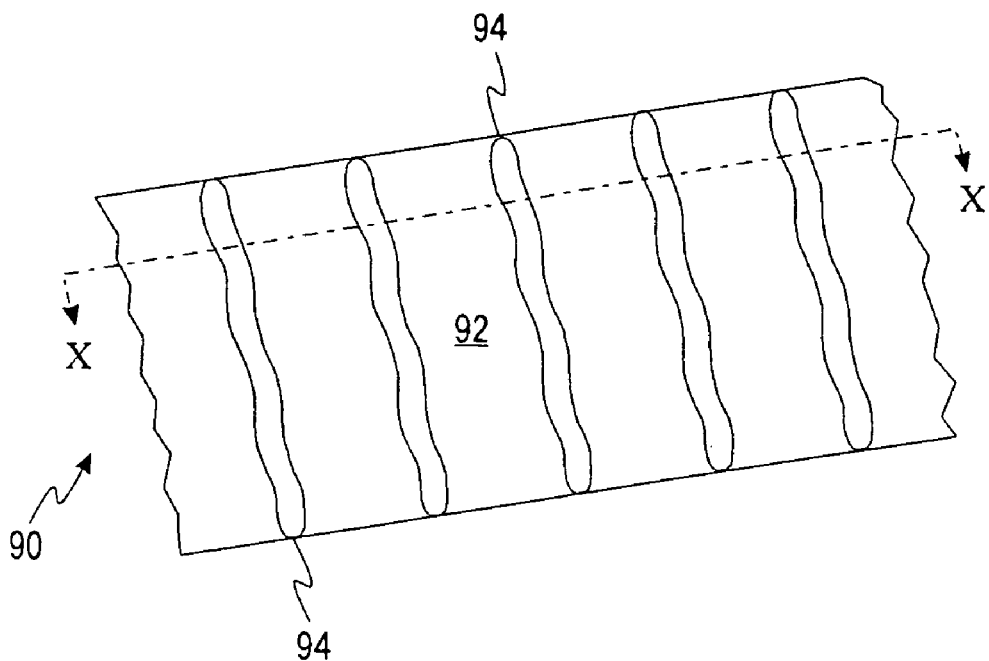
FIG. 9 is a top perspective view of a yarn protective wrap according to yet another embodiment.
Figure 10:
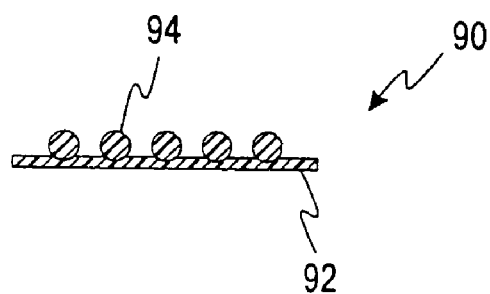
FIG. 10 is a cross-sectional view taken generally along line X-X of FIG. 9.

Referring to FIGS. 9 and 10, a protective drainage wrap 90 includes a solid sheet portion 92 and a yarn portion 94 according to yet another embodiment. The protective wrap 90, as discussed above with respect to protective wraps 10, 20 and 60, is adapted to be attached over sheathing or framing members.

To assist in draining the moisture via gravity, the yarn portion 94 is preferably installed in a generally vertical position (i.e., the transverse direction material). The yarn portion 94 is similar to that described above with respect to yarn portion 64. The protective wrap 90 may include perforations therein to assist in increasing the water vapor transmission rate.

The solid sheet portion 92 may be made of polymeric materials such as polyolefins, polyesters, nylons or combinations thereof. The solid sheet portion 92 may be a breathable film. Similarly, the yarn portion 94 may be made of polymeric materials such as polyolefins, polyesters, nylons or combinations thereof. Alternatively, the yarn portion may be cross-woven through a solid sheet tape portion having a plurality of holes therein (not shown).

The protective drainage wrap may include a solid sheet portion and a plurality of transverse direction tapes, such as the transverse direction tapes 12b described above. The plurality of tapes are installed so as to assist in providing drainage for moisture build-up.

Figure 11:
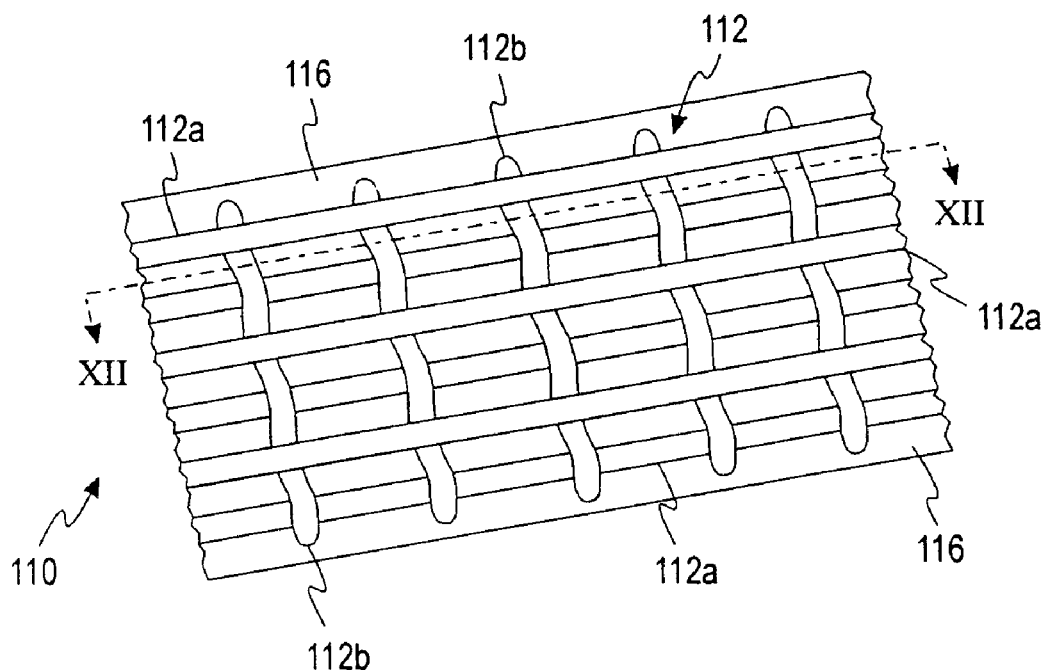
FIG. 11 is a top perspective view of a cross-woven protective wrap according to one embodiment.
Figure 12:
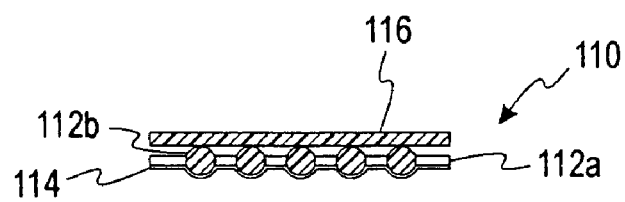
FIG. 12 is a cross-sectional view taken generally along line XII-XII of FIG. 11.
Figure 13:
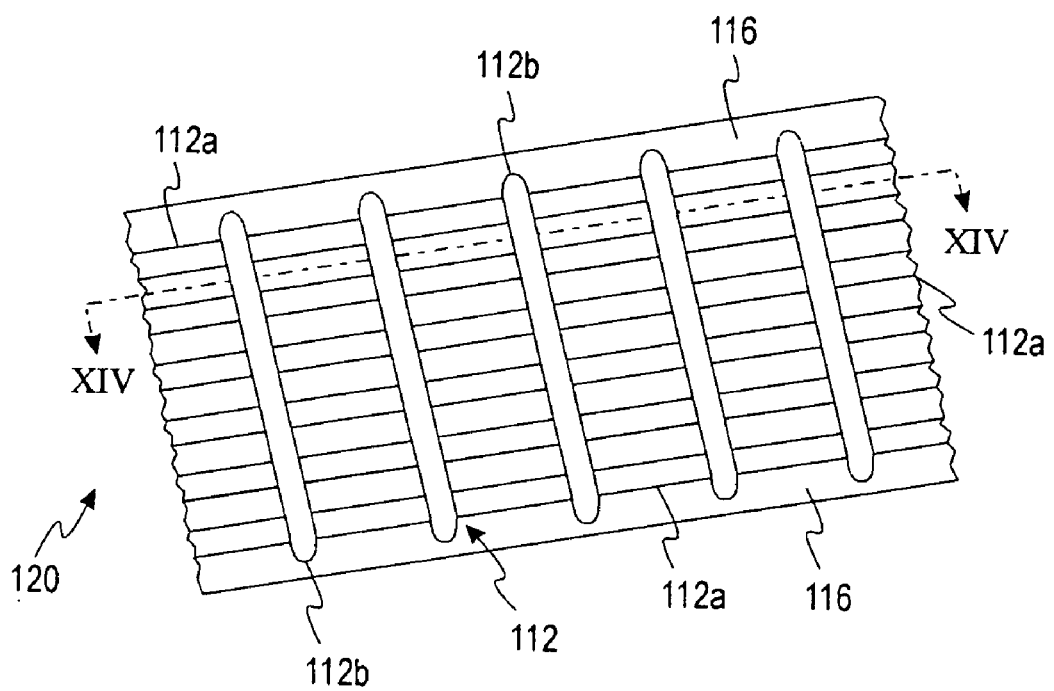
FIG. 13 is a top perspective view of a cross-laminated protective wrap according to another embodiment of the present invention.
Figure 14:
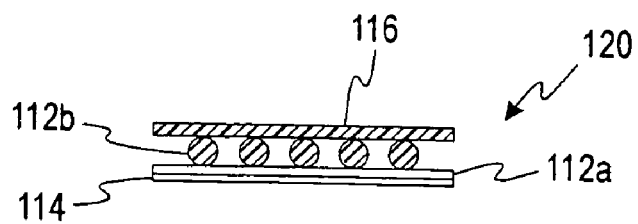
FIG. 14 is a cross-sectional view taken generally along line XIV-XIV of FIG. 13.

Turning to FIGS. 11 and 12, a protective drainage wrap 110 according to one embodiment of the present invention is shown. The drainage wrap 110 includes a first portion 112, a second portion or coating 114 and a solid sheet portion 116. The first portion 112 of the protective wrap 110 may be cross-woven such as shown in FIGS. 11 and 12. Alternatively, the first portion of the present invention may be cross-laminated, such as shown in FIGS. 13 and 14 with cross-laminated protective drainage wrap 120. The protective wraps are adapted to be attached over sheathing or framing members.

As discussed above, the first portion of the protective wrap provides a desirable strength that assists in inhibiting or preventing tears and/or fraying that may be caused during installation. The first portion 112, as shown in FIG. 11, includes a plurality of machine direction (MD) tapes or strands 112a and a plurality of transverse direction (TD) tapes or strands 112b. The first portion 112 of FIG. 11 is commonly referred to as a cross-woven scrim.

The materials, structure (e.g., size and shape), and scrim counts of the first portion 112 may be the same as described above with respect to first portion 12. For example, the plurality of tapes or strands, 112a, 112b may be made of materials such as polyolefins, polyesters, nylons or combinations thereof. The scrim count is typically a greater number in the machine direction than the transverse direction. Each of the plurality of machine direction and/or transverse direction tapes 112a, 112b may be made of single fibers or filaments, or a plurality of fibers or filaments aligned with each other. It is contemplated that the plurality of machine direction and transverse direction tapes 112a, 112b may be made of a mixture of single fibers or filaments, and a plurality of fibers or filaments aligned with each other. For example, the single fibers or filaments may be alternated with the plurality of fibers or filaments aligned with each other such that the thicknesses of the tapes vary.

If natural vapor transmission is desired in a woven protective wrap, the transverse direction tapes 112b must be of a sufficient thickness to enable a natural vapor transmission to be formed when the coating 114 is applied to the first portion 112. The natural vapor transmission mechanism is formed via open interstices/spaces along the transverse direction tapes 112b after the coating 114 is applied. The protective wrap with open interstices/spaces may be perforated to enhance natural vapor transmission. If the protective wrap is formed without interstices/spaces, the protective wrap often is perforated to provide for desirable water vapor transmission.

The thicknesses of the transverse direction tapes 112b of the present invention provide unique vertical channels and, when installed, allow water to readily exit a wall system. To enhance moisture drainage, the thickness of the transverse direction tapes 112b is generally at least about 2 times greater than the thickness of the machine direction tapes 112a. The thickness of the transverse direction tapes 112b is generally at least about 3 or about 4 times greater than the thickness of the machine direction tapes 112a. The thickness of the transverse direction tapes 112b may be from about 6 to about 8 times greater than the thickness of the machine direction tapes 112a.

Figure 15:
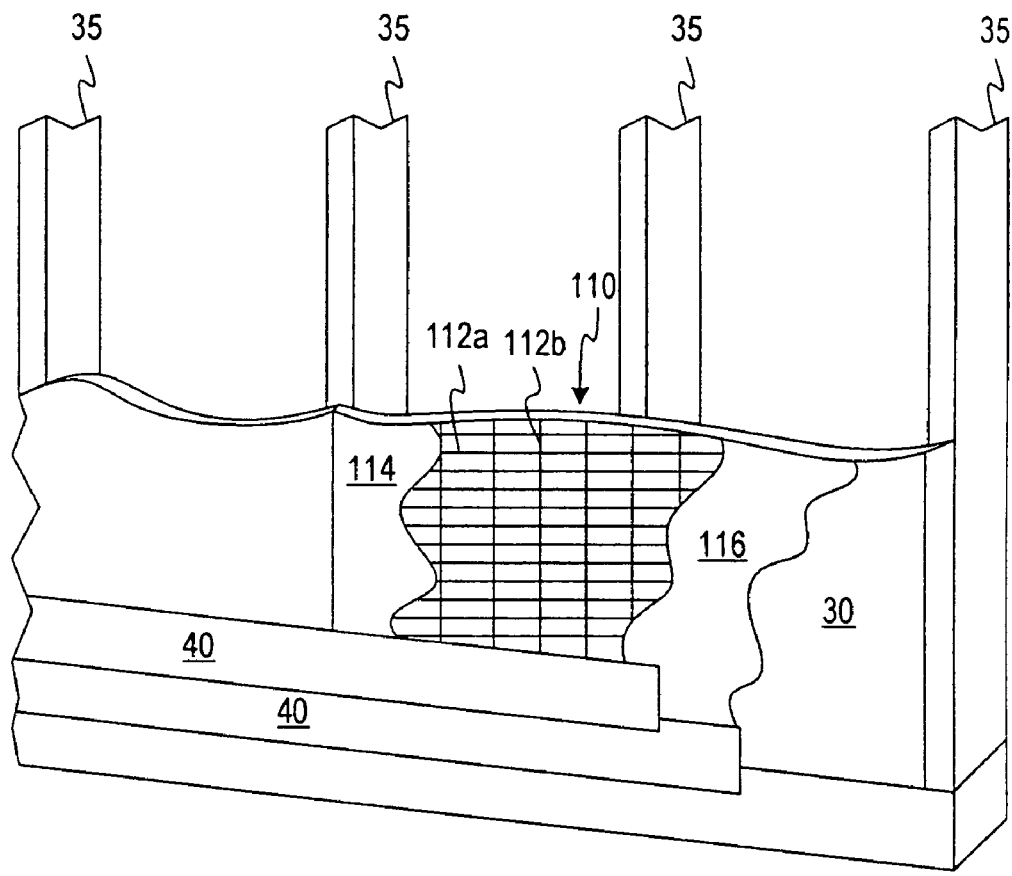
FIG. 15 is a cut-away perspective view of a protective wrap of FIG. 11 fastened to sheathing and a framing member according to another embodiment of the present invention.

The plurality of transverse direction tapes 112b according to one embodiment of the present invention is shown in FIG. 15 after being installed. The transverse direction tapes 112b are generally perpendicular to the machine direction tapes 112a so as to enhance moisture drainage. It is contemplated that the tapes 112b may be located generally diagonally with respect to the tapes 112a as long as the tapes 112b are in a generally downward position when installed.

The second portion or coating 114 of the protective wrap 110 is applied to the first portion 112. The coating 114 may be made of the same materials and thicknesses as described above with respect to coating 14. For example, the coating 114 may be made from polyolefins, polyesters, nylons or combinations thereof. The coating 114 is shown as being applied to one surface of the first portion 112 in FIG. 12. It is contemplated that the coating 114 may be provided on both surfaces of the first portion 112 (not shown) as long as the coating 114 enables the transverse direction tapes 112b to still provide channels that enhance moisture drainage, external to the protective wrap. The coating 114 may be applied by the same processes to the first portion 112 as described above with respect to the coating 14 and the first portion 12.

The solid sheet portion 116 may be made of polymeric materials such as polyolefins, polyesters, nylons or combinations thereof. The solid sheet portion 116 may be a breathable film. It may be desirable to use a breathable film because it allows the internal wall structure to breathe in a similar manner as building paper. The breathable film allows water vapor to exit while preventing or inhibiting water flow therethrough. Breathable films that may be used include those made by 3M Company (SCOTCH®. microporous films), Exxon (Exxaire porous films) and AssiDoman Bellcoat in Belgium. It is contemplated that other breathable films may be used in the present invention.

The solid sheet portion 116 may be attached or bonded to the first portion 112 and/or coating 114 by an adhesive or by heat bonding. A preferred adhesive is a breathable-type adhesive. The solid sheet portion 116 is typically attached to the first portion 112 as shown, for example, in FIGS. 12 and 14. Such an attachment or bond assists in forming better defined channels for water drainage.

Figure 16:
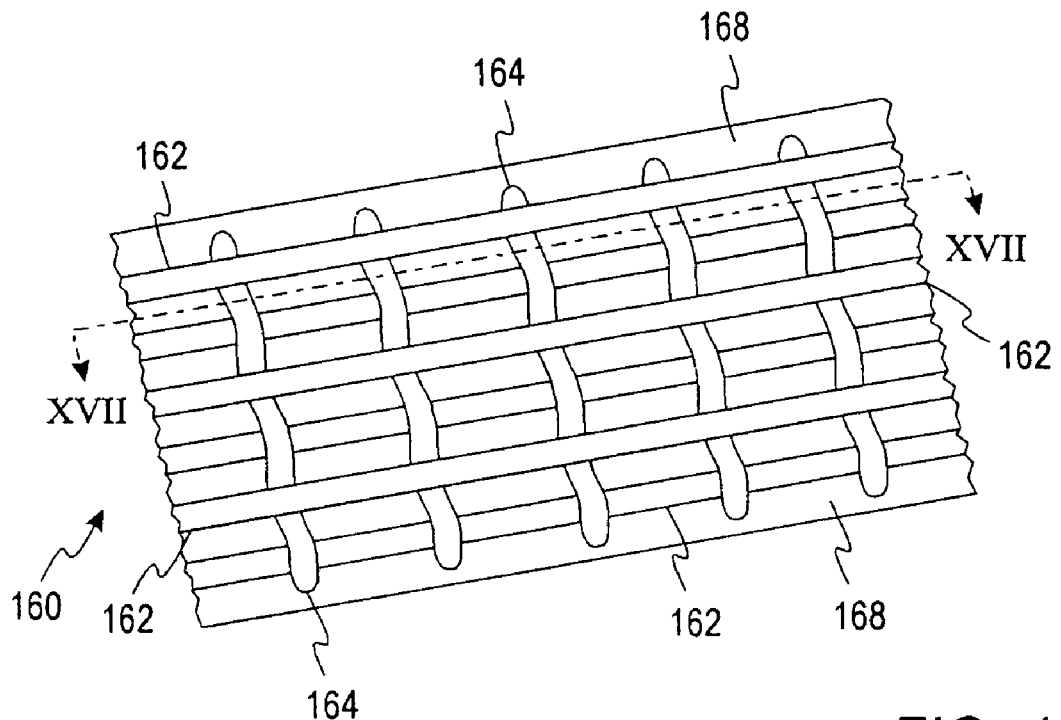
FIG. 16 is a top perspective view of a yarn cross-woven protective wrap according to yet another embodiment of the present invention.
Figure 17:
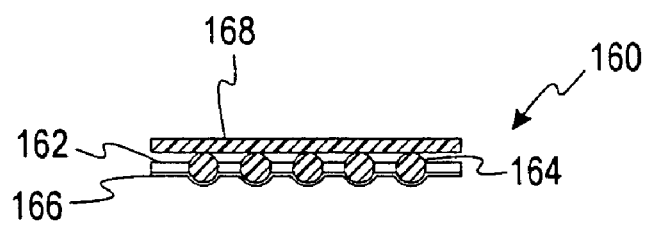
FIG. 17 is a cross-sectional view taken generally along line XVII-XVII of FIG. 16.

According to yet another embodiment of the present invention, a protective drainage wrap 160 is shown in FIGS. 16 and 17. The protective wrap 160 is adapted to be attached to sheathing or framing members. The protective wrap 160 includes a tape or strand portion 162, a yarn portion 164, a coating portion 166 and a solid sheet portion 168. The tape portion 162 of FIGS. 16 and 17 includes a plurality of tapes in the machine direction, while the yarn portion 164 includes a plurality of yarn strands in the transverse direction.

The tape portion 162 may be made of materials such as polyolefins, polyesters, nylons or combinations thereof. Examples of such materials are described above with respect to the first portion 12, including polypropylenes or polyethylenes. The tape portion 162 may be made in a similar manner as described above with respect to the machine direction tape 12a.

The yarn portion 164 is capable of absorbing moisture such as water. Additionally, the yarn portion 164 may be capable of wicking the moisture which may provide further enhancement to the hydration properties. The yarn portion 164 may be made of the same materials and may be installed in the same manner as described above with the yarn portion 64. It is contemplated that the strands of yarn portion 164 may have varying numbers of fibers or filaments twisted with each other such that the thicknesses of the strands differ. For example, the strands of yarn portion 164 may alternate the number of fibers or filaments twisted with each other to provide strands of varying thicknesses. The yarn portion 164 may be made of polymeric materials such as polyolefins (e.g., polypropylenes or polyethylenes), polyesters, nylons or combinations thereof. Types of yarn that may be used include spun yarn, bulk continuous process (bcp) yarn and natural yarn (e.g., jute).

The yarn portion 164 and the tape portion 162 are preferably located in directions that are generally perpendicular to each other. This location of the yarn portion 164 with respect to the tape portion 162 is depicted in FIG. 16. It is contemplated, however, that the yarn portion 164 may be located generally diagonally from the tape portion 162 as long as the yarn portion 164 is in a generally downward position when installed.

As depicted in FIG. 16, each of the plurality of yarn strands of the yarn portion 164 is woven between the plurality of tapes/strands of the tape portion 162. When cross-woven, the combination of the yarn portion 164 and the tape portion 162 may be referred to as a cross-woven scrim. The yarn portion 164 and the tape portion 162 may be woven by various techniques including with the use of a loom.

Alternatively, the tape portion 162 and the yarn portion 164 may be cross-laminated (not shown) by adhering the plurality of tapes and plurality of yarn strands together via the use of a suitable adhesive.

The coating 166 may be made from polyolefins, polyesters, nylons and combinations thereof as discussed above with respect to the coating 14. The solid sheet portion 168 may be made of polymeric materials such as polyolefins, polyesters, nylons or combinations thereof. The solid sheet portion 168 may be a breathable film such as discussed above with respect to the solid sheet portion 116.

The solid sheet portion 168 may be attached or bonded to the tape portion 162, yarn portion 164 and/or coating 166. The solid sheet portion 168 is typically attached or bonded to the yarn portion 164 as shown, for example, in FIG. 17. The solid sheet portion 168 may be heat bonded to the yarn portion 164. The solid sheet portion 168 may also be attached to the yarn portion 164 by an adhesive (e.g., a breathable-type adhesive).

Protective Wrap Additives

Additives to the protective wraps are contemplated in the present invention. For example, the protective wraps may include colorant additives to resist the glare of the sun. The addition of colorant assists workers in installing the protective wrap. The protective wraps may also include chemical additives such as ultraviolet inhibitors and antioxidants to withstand deterioration from prolonged exposure to sunlight. In addition, the protective wraps of the present invention may be translucent. Translucent protective wraps assist in locating studs, as well as window and door openings. The protective wraps of the present invention may also include printing thereon.

Properties of the Protective Wrap

The protective wraps of the present invention provide improved drainage characteristics. The protective wraps of the present invention also provide for water vapor transmission rates (WVTR) as measured by ASTM E 96, Procedure A. The woven portion of the protective wraps generally have water vapor transmission rates of from about 5 to about 15 perms.

The tensile strength of woven protective wraps as measured by ASTM D 882 is generally greater than about 25 lbs/in. The tensile strength of woven protective wraps is preferably greater than about 30 lbs./in. and more preferably greater than about 35 lbs/in. as measured by ASTM D 882. It is beneficial that the protective wraps of the present invention are strong so as to inhibit or prevent tearing and/or fraying during or after installation. Tearing and/or fraying may, and typically will, result in unwanted air infiltration and/or moisture penetration.

The TD tear strength of woven protective wraps as measured by ASTM D 1117 is generally greater than 25 lbs. The TD tear strength of woven protective wraps is preferably greater than about 30 lbs and more preferably greater than about 35 lbs as measured by ASTM D 1117.

Non-woven protective wraps, such as breathable films, generally have water vapor transmission rates of up to from about 30 or 60 perms as measured by ASTM E 96, Procedure A. The tensile strength of non-woven protective wraps as measured by ASTM D 882 is generally greater than about 15 lbs./in, and preferably greater than about 20 or 25 lbs./in. The TD tear strength of non-woven protective wraps as measured by ASTM D 1117 is generally greater than 10 lbs, and preferably greater than about 15 or 20 lbs.

The protective wraps of the present invention may be formed into a number of shapes. The protective wraps, however, are generally stored in a roll on a circular cardboard core. The protective wraps of the present invention may be manufactured in a variety of sizes. Popular sizes used in residential and commercial construction include, but are not limited to, 3 foot by 100 foot (3'×100'), 4 5'×100', 4.5'×150', 4.5'×195', 9'×100', 9'×150', 9'×195' and 10'×150'. For example, the 3' length extends in the transverse direction, while the 100' length extends in the machine direction.

The thickness of the protective wraps may also vary, but is generally from about 8 to about 12 mils as measured by ASTM D 751. The thickness of the protective wraps is typically from about 9 to about 11 mils. Popular thickness of protective wraps includes about 10 mils.

Use of the Protective Wrap

The protective wraps of the present invention may be used as wraps in residential and commercial buildings. The protective wrap is typically covered by an exterior covering like siding, brick, stone, masonry or concrete veneer. Alternatively, the protective wraps of the present invention may be used as stucco drainage wraps in which the protective wraps are covered by a cementitious exterior covering (stucco or EIFS). The protective wrap may also assist in controlling the drying/curing process of the cementitious exterior covering so that the hydration of the exterior covering will not occur too fast or too slow.

Methods of Applying the Protective Drainage Wrap

According to one process of the present invention, a protective drainage wrap is attached directly to sheathing which is attached to framing members. The sheathing may be made from various materials. Some examples of materials used as sheathing include thin composite laminations, fiberboard, oriented-strand board (OSB), plywood, polyisocyanurate foam, extruded polystyrene (XPS) foam, and molded expanded polystyrene (EPS) foam. Some examples of framing members include plywood and OSB. The protective wraps may be attached mechanically to the sheathing by using fasteners such as nails or staples.

One example of a protective wrap attached to a sheathing is shown in FIG. 15 where the protective wrap 110 (first portion 112, second portion 114 and solid sheet portion 116) is installed over the sheathing 30. The sheathing 30 is attached to a plurality of framing members 35. Types of framing members that may be used include southern yellow pine (SYP) and spruce pine fur (SPF). Some framing members, however, may be made of metal. The protective wrap 110 of FIG. 15 has been cut-away to depict the first portion 112, the second portion 114 and the solid sheet portion 116. FIG. 15 also shows an exterior covering (siding 40) that is located on an exterior surface of the protective wrap 110. The second portion 114 is located adjacent to the siding 40 and assists in allowing water to exit a wall system. The solid sheet portion 116 of FIG. 15 is located adjacent to the sheathing 30

Another embodiment is shown in FIG. 5 with the protective wrap 10 that includes the first portion 12 and second portion 14. In FIG. 5, the sheathing 30 is attached to the plurality of framing member 35 and the first portion 12 is adjacent to the siding 40.

Figure 18:
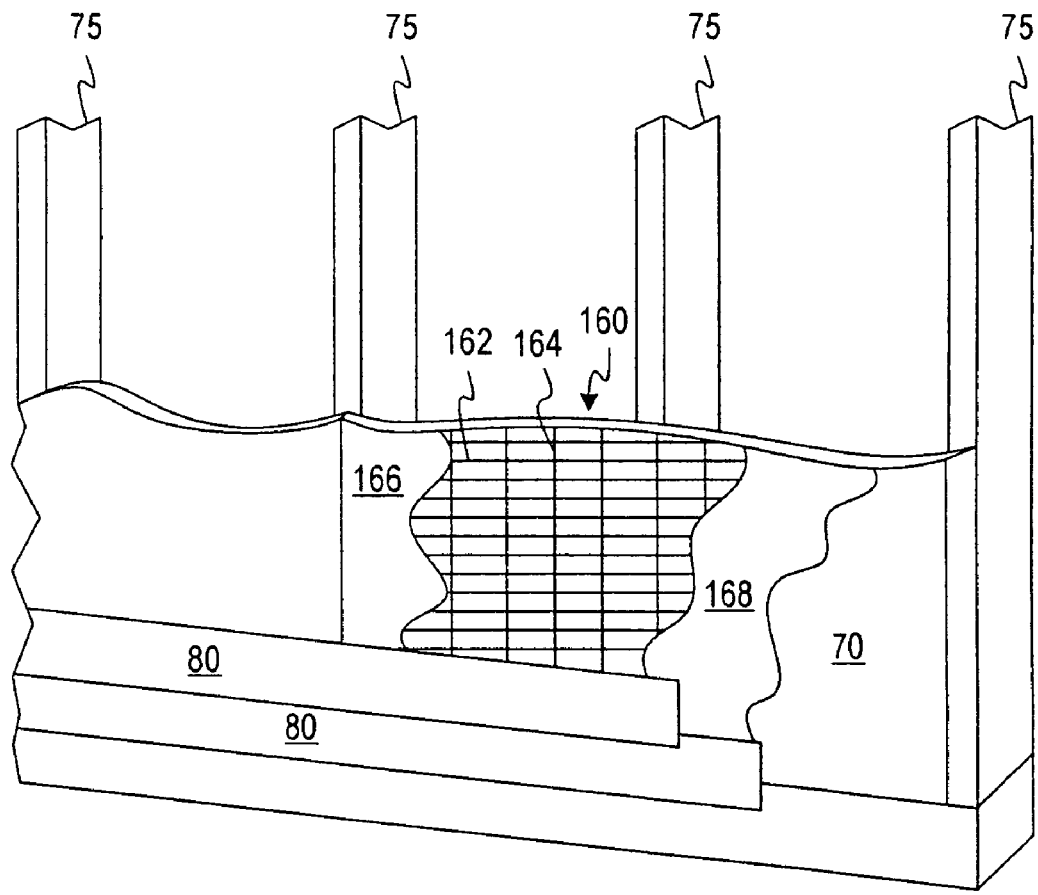
FIG. 18 is a cut-away perspective view of a protective wrap of FIG. 16 fastened to sheathing and a framing member according to yet another embodiment of the present invention While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

The protective drainage wrap 160 (tape portion 162, yarn portion 164, coating portion 166, and the solid sheet portion 168) is shown in FIG. 18 over sheathing 70. The sheathing is attached to a plurality of framing members 75. The protective wrap 160 of FIG. 18 has been cut-away to depict the tape portion 162, the yarn portion 164, coating portion 166, and solid sheet portion 168. FIG. 18 also shows an exterior covering (siding 80) that is located on an exterior surface of the protective wrap 160. The coating portion 166 is located adjacent to the siding 80 and assists in allowing water to exit a wall system. The solid sheet portion 168 of FIG. 18 is located adjacent to the sheathing 70.

Figure 8:
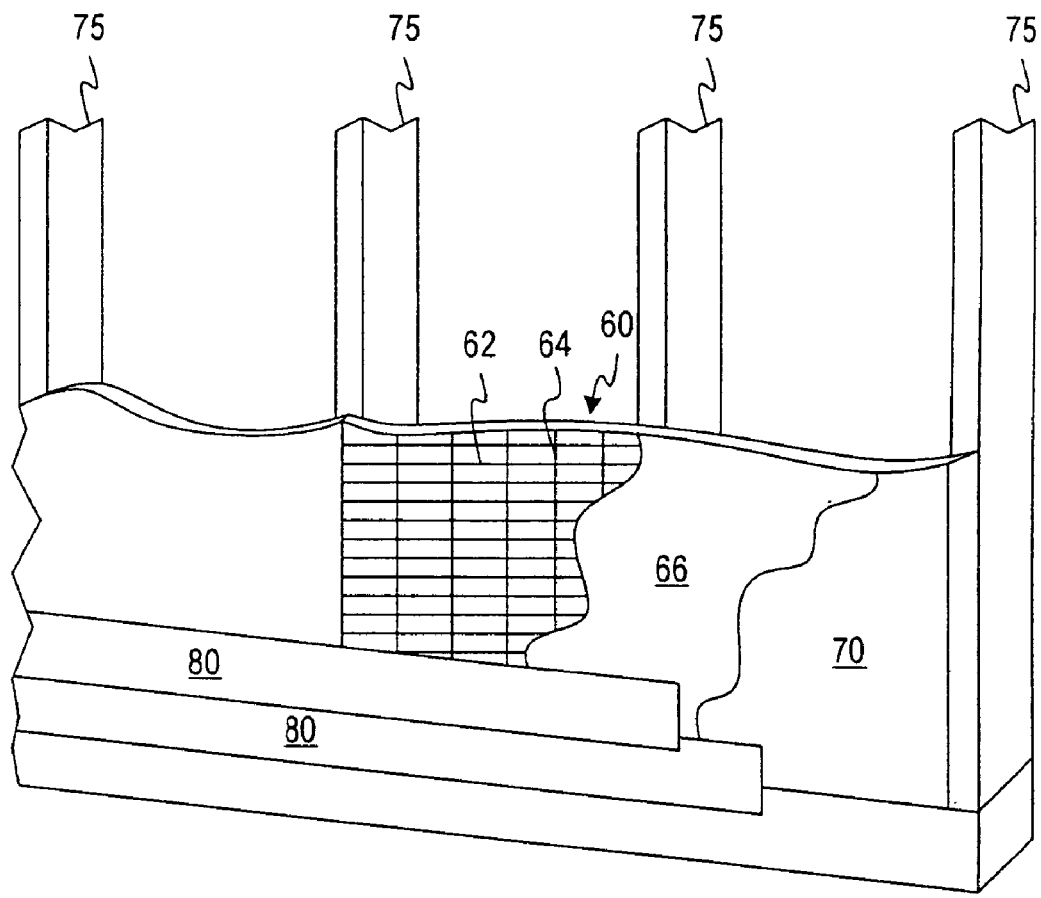
FIG. 8 is a cut-away perspective view of a protective wrap of FIG. 6 fastened to sheathing and a framing member according to another embodiment.

Another embodiment is shown in FIG. 8 with protective wrap 60 that includes tape portion 62, yarn portion 64 and coating 66. In FIG. 8, the sheathing 70 is attached to the plurality of framing members 75, and the yarn portion 64 is adjacent to the siding 80.

The sheathing 120 (FIGS. 13 and 14) may be attached in a similar fashion as described above with respect to protective drainage wraps 110 and 160.

According to another process of the present invention (not shown), the protective wrap is installed directly over a plurality of framing members. The protective wrap may be attached to the plurality of framing members in a similar manner as discussed above with respect to attaching the protective wrap to the sheathing.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A protective drainage wrap including:
a mesh having material extending in a first direction and in a second direction, the material in the first direction including a polyolefin, polyester, nylon or combinations thereof, the material in the second direction including a polyolefin, polyester, nylon or combinations thereof; and
a coating applied to the mesh to form a plurality of interstices, the interstices being configured to facilitate transfer of water vapor therethrough, the coating having a thickness between about 0.5 mil and about 2.0 mils to assist in forming natural vapor transmission through the interstices, the coating being on an outermost surface of the protective drainage wrap so as to assist in forming a natural vapor transmission
wherein the mesh is cross-laminated.

2. A protective drainage wrap including:
a mesh having material extending in a first direction and in a second direction, the material in the first direction including a polyolefin, polyester, nylon or combinations thereof, the material in the second direction including a polyolefin, polyester, nylon or combinations thereof; and
a coating applied to the mesh to form a plurality of interstices, the interstices being configured to facilitate transfer of water vapor therethrough, the coating having a thickness between about 0.5 mil and about 2.0 mils to assist in forming natural vapor transmission through the interstices, the coating being on an outermost surface of the protective drainage wrap so as to assist in forming a natural vapor transmission
wherein the first direction material has a first thickness, the second direction material has a second thickness, and the second thickness is at least about twice the first thickness.

3. A protective drainage wrap including:
a mesh having material extending in a first direction and in a second direction, the material in the first direction including a polyolefin, polyester, nylon or combinations thereof, the material in the second direction including a polyolefin, polyester, nylon or combinations thereof; and
a coating applied to the mesh to form a plurality of interstices, the interstices being configured to facilitate transfer of water vapor therethrough, the coating having a thickness between about 0.5 mil and about 2.0 mils to assist in forming natural vapor transmission through the interstices, the coating being on an outermost surface of the protective drainage wrap so as to assist in forming a natural vapor transmission
wherein the first direction material and the second direction material are different.

* * * * *